US012586458B2

(12) United States Patent
Austin et al.

(10) Patent No.: US 12,586,458 B2
(45) Date of Patent: Mar. 24, 2026

(54) SYSTEMS AND METHODS FOR EXTERNAL DISPLAY-BASED PEDESTRIAN NAVIGATION ASSISTANCE

(71) Applicant: Toyota Motor Engineering & Manufacturing North America, Inc., Plano, TX (US)

(72) Inventors: Benjamin Piya Austin, Saline, MI (US); Rohit Gupta, Santa Clara, CA (US); Rebecca L Kirschweng, Bloomfield Hills, MI (US); Stuart Parson, Tokyo (JP); Stephanie Seohyun Park, Tokyo (JP); Yukiyo Nozawa, Tokyo (JP); Yen Yu Chen, Tokyo (JP); Ryusuke Shimizu, Tokyo (JP); Uyakhan-Egshig Molomjamts, Tokyo (JP)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 98 days.

(21) Appl. No.: 18/395,987

(22) Filed: Dec. 26, 2023

(65) Prior Publication Data

US 2025/0209905 A1     Jun. 26, 2025

(51) Int. Cl.
| *G08G 1/00* | (2006.01) |
| *B60Q 1/00* | (2006.01) |
| (Continued) | |

(52) U.S. Cl.
CPC ............. *G08G 1/005* (2013.01); *B60Q 1/525* (2013.01); *G01C 21/3661* (2013.01)

(58) Field of Classification Search
CPC ..... G08G 1/005; B60Q 1/525; G01C 21/3661
(Continued)

(56) References Cited

U.S. PATENT DOCUMENTS

| 7,991,548 B2 | 8/2011 | Singh |
| 8,355,888 B2 | 1/2013 | Chernoguz et al. |
| (Continued) | | |

FOREIGN PATENT DOCUMENTS

| DE | 102022130912 A1 * | 5/2024 | ........... G06Q 10/047 |
| JP | 2006233503 A | 9/2006 | |
| (Continued) | | | |

OTHER PUBLICATIONS

Translation of DE102022130912A1 (Year: 2022).*
(Continued)

*Primary Examiner* — Tiffany P Young
(74) *Attorney, Agent, or Firm* — Christopher G. Darrow; Darrow Mustafa PC

(57) ABSTRACT

Systems, methods, and other embodiments described herein relate to providing navigational guidance to a pedestrian on infrastructure elements or vehicles in the vicinity of the pedestrian based on the pedestrian being identified as unfamiliar with an environment. In one embodiment, a method includes determining that a pedestrian is in an unfamiliar area based on sensor data that characterizes the pedestrian. The method also includes acquiring a navigational instruction presented on a user device of the pedestrian. The method further includes presenting navigational assistance on an electronic display in a vicinity of the pedestrian responsive to an indication that the pedestrian is in the unfamiliar area. The navigational assistance is based on the navigational instruction.

20 Claims, 7 Drawing Sheets

(51) Int. Cl.
    *B60Q 1/50*  (2006.01)
    *G01C 21/00*  (2006.01)
    *G01C 21/36*  (2006.01)
    *G08G 1/005*  (2006.01)

(58) Field of Classification Search
    USPC ........................................................ 701/423
    See application file for complete search history.

(56)                References Cited

U.S. PATENT DOCUMENTS

| | | | |
|---|---|---|---|
| 8,457,879 | B2 | 6/2013 | Merkel et al. |
| 8,560,091 | B2 | 10/2013 | Reumerman et al. |
| 9,046,380 | B2 | 6/2015 | Mori et al. |
| 9,454,745 | B2 | 9/2016 | Howard |
| 9,662,015 | B2 | 5/2017 | Proud et al. |
| 9,696,159 | B2 | 7/2017 | Chen et al. |
| 9,791,286 | B2 | 10/2017 | Di Censo et al. |
| 10,780,897 | B2 | 9/2020 | Kim et al. |
| 11,079,765 | B2 | 8/2021 | Reiley et al. |
| 11,830,357 | B1 * | 11/2023 | Murphy ............... G08G 1/0145 |

| | | | | |
|---|---|---|---|---|
| 2009/0224892 | A1 | 9/2009 | Nicholls | |
| 2010/0268450 | A1 | 10/2010 | Evanitsky | |
| 2016/0356612 | A1 * | 12/2016 | Beaurepaire ............ | H04W 4/80 |
| 2017/0315825 | A1 | 11/2017 | Gordon et al. | |
| 2019/0178659 | A1 * | 6/2019 | DeLuca ................. | G01C 21/34 |
| 2020/0124420 | A1 * | 4/2020 | Andreuzzi ............. | A61H 3/061 |
| 2021/0381844 | A1 * | 12/2021 | Baig .................. | G01C 21/3644 |
| 2022/0256255 | A1 | 8/2022 | Dixit | |
| 2023/0130857 | A1 | 4/2023 | Hewett | |

FOREIGN PATENT DOCUMENTS

| | | | | | |
|---|---|---|---|---|---|
| JP | | 6341311 | B2 * | 6/2018 | ......... G01C 21/3691 |
| KR | | 20220023289 | A * | 3/2022 | ............. G05D 1/246 |
| WO | WO-2020040147 | A1 * | 2/2020 | ............. G01C 21/20 |

OTHER PUBLICATIONS

English Translation of WO2020040147 (Year: 2020).*
English translation of JP-6341311. (Year: 2018).*
Translation of KR20220023289 (Year: 2022).*

* cited by examiner

104

544-1

544-2

542-1

542-2

542-3

542-4

544-3

SYSTEMS AND METHODS FOR EXTERNAL DISPLAY-BASED PEDESTRIAN NAVIGATION ASSISTANCE

TECHNICAL FIELD

The subject matter described herein relates, in general, to providing navigation assistance to a pedestrian and, more particularly, to providing familiarity-based navigation assistance to a pedestrian via external displays on vehicles or infrastructure elements.

BACKGROUND

Due to the rate of technological development, tools that were unimaginable just 100 years ago are not only commonly available but are immediately accessible via a user device that an individual may carry on their person. For example, before the development of navigational applications and programs on user devices such as smartphones, a pedestrian would find their way through an unfamiliar area via paper street maps and asking locals for directions. With the advent of wireless communication and location-based technologies such as global positioning system (GPS), a pedestrian may enter a desired location into a smartphone navigational application and receive step-by-step instructions. Notwithstanding the benefits of such applications and device functionality, pedestrians in unfamiliar areas may still struggle to navigate streets, paths, and alleys.

SUMMARY

In one embodiment, example systems and methods relate to a manner of improving pedestrian navigation in unfamiliar environments. Specifically, example systems and methods identify when a pedestrian is in an unfamiliar area and is using a navigational application to direct them to an intended destination. Responsive to the pedestrian being unfamiliar with the area, the system extracts a route from the navigational application and controls nearby vehicles and/or infrastructure elements to present real-world navigation instructions to guide the pedestrian along the route toward their selected destination.

In one embodiment, a navigation assistance system for generating physical world cues of the navigational route provided on a user device of a pedestrian is disclosed. The navigation assistance system includes one or more processors and a memory communicably coupled to the one or more processors. The memory stores instructions that, when executed by the one or more processors, cause the one or more processors to determine that a pedestrian is in an unfamiliar area based on sensor data that characterizes the pedestrian. The memory also stores instructions that, when executed by the one or more processors, cause the one or more processors to acquire a navigational instruction presented on a user device of the pedestrian. The memory also stores instructions that, when executed by the one or more processors, cause the one or more processors to present navigational assistance on an electronic display device in the vicinity of the pedestrian, responsive to an indication that the pedestrian is in the unfamiliar area. The navigational assistance is based on the navigational instruction.

In one embodiment, a non-transitory computer-readable medium for generating physical world cues of the navigational route provided on a user device of a pedestrian and including instructions that, when executed by one or more processors, cause the one or more processors to perform one or more functions is disclosed. The instructions include instructions to determine that a pedestrian is in an unfamiliar area based on sensor data that characterizes the pedestrian. The instructions include instructions to acquire a navigational instruction presented on a user device of the pedestrian. The instructions include instructions to present navigational assistance on an electronic display device in a vicinity of the pedestrian, responsive to an indication that the pedestrian is in the unfamiliar area. The navigational assistance is based on the navigational instruction.

In one embodiment, a method for generating physical world cues of the navigational route provided on a user device of a pedestrian is disclosed. In one embodiment, the method includes determining that a pedestrian is in an unfamiliar area based on sensor data that characterizes the pedestrian. The method also includes acquiring a navigational instruction presented on a user device of the pedestrian. The method also includes presenting navigational assistance on an electronic display device in a vicinity of the pedestrian, responsive to an indication that the pedestrian is in the unfamiliar area. The navigational assistance is based on the navigational instruction.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
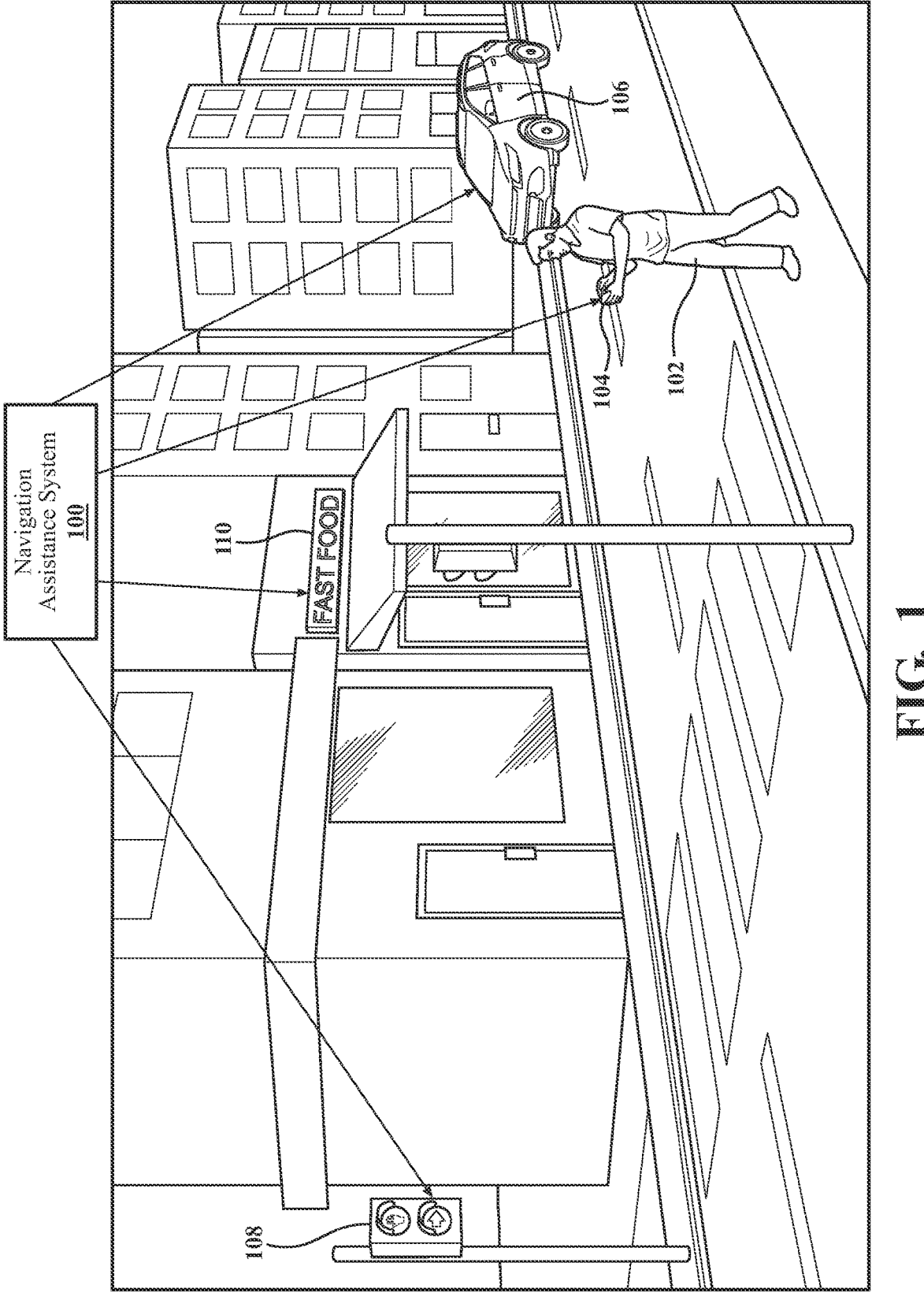
FIG. 1 illustrates a navigation assistance system that is associated with providing familiarity-based navigation assistance to a pedestrian.

Systems, methods, and other embodiments associated with improving pedestrian navigation assistance are disclosed herein. As previously described, with the advent of wireless communication and location-based technologies such as global positioning system (GPS), a pedestrian may enter a desired location into a navigational application on a mobile device and receive step-by-step navigational instructions. Notwithstanding the unquestioned benefit of such applications and device functionality, pedestrians in unfamiliar areas may still struggle to navigate unfamiliar streets, paths, and alleys. For example, it may be unintuitive and difficult to follow digitally presented navigational instructions in the real world. As a specific example, a hub intersection in an urban center may have many branching streets. Based solely on the device-provided navigational instructions, a pedestrian may be confused about which of the numerous streets they should take.

Moreover, given the potential limits of the accuracy of the navigation application and the GPS transceivers of the user device, the exact relative position of the pedestrian relative to waypoints along the route may be difficult to ascertain. For example, navigational instructions may instruct a pedestrian to turn left onto an upcoming street. However, the limitations of GPS localization may make it difficult for the pedestrian to determine whether they should turn left onto a first street or a nearby second street. As another example, real-world environments may change and the navigation application may not be updated accordingly. For example, a road name may change and the new road name may not be reflected in the navigation application. As such, a pedestrian relying on the device-based application instructions alone may be confused. The device-based navigation instructions are also unable to map the navigational instructions provided on the user device to the physical world in which the pedestrian is found. Still further, pedestrians unfamiliar with local road culture may face challenges that can lead to disorientation and anxiety, making it harder to navigate the environment safely and effectively. Unfamiliar/confused pedestrians may be more vulnerable to crime and theft in unfamiliar surroundings, further adding to any anxiety they may already be experiencing.

Accordingly, the navigation assistance system of the present specification assists a pedestrian who is unfamiliar with an area by controlling local infrastructure elements and/or vehicles to highlight waypoints along the navigational route indicated by a mobile device of the pedestrian. First, the navigation assistance system determines when the pedestrian is in an unfamiliar area by evaluating sensor data retrieved from sensors worn by the user (e.g., electroencephalography (EEG) sensors, near-infrared spectroscopy (NIRS) sensors, galvanic skin response (GSR) sensors, and heart rate sensors, among others) or from sensors, such as cameras, integrated with local infrastructure elements (e.g., lamp posts, traffic signals, etc.) and vehicles. Certain physical characteristics and movements of the pedestrian may indicate they are unfamiliar with an area. Examples of unfamiliarity-based physical traits and movements include elevated heart rate, increased skin arousal, rapidly looking at different objects in the environment, pedestrian hands positioned on their hips, looking far down the road, standing in one spot for an extended period, asking others for directions, and looking at signs for an extended period, among others. Based on this data, the navigation assistance system determines whether the pedestrian is lost/unfamiliar with their surroundings.

In an example, the navigation assistance system compares the current behavior of the pedestrian to the historical behavior of the pedestrian and may rely on machine learning to do so. For example, the system may compare the sensor data to 1) the historical behavior of when the pedestrian was identified as being in a familiar environment and 2) the historical behavior of when the pedestrian was identified as being in a new environment to determine whether the pedestrian is behaving as if they are lost, confused, or unfamiliar with their surroundings.

When the system determines that the pedestrian is unfamiliar with their surroundings, the system manipulates infrastructure elements and/or vehicles near the pedestrian. For example, the navigation assistance system may receive a navigation route from a user device (e.g., phone or other mobile communication device capable of navigation) of the pedestrian and control local infrastructure elements and/or vehicles to output visual/audible notifications that assist the user in navigating along the route. For example, a streetlight along the route may flash to lead the pedestrian along the travel route indicated by the navigation application.

In addition to controlling the infrastructure elements/vehicles to provide real-world navigation beacons, the navigation assistance system may identify, on a map of the navigation application, stores, restaurants, businesses, or individuals that the pedestrian is already comfortable with or may be comfortable with. As another example, the navigation assistance system may present notifications of traffic regulations, local laws and regulations, or other safety information about the area.

In this way, the disclosed systems, methods, and other embodiments improve pedestrian navigation systems by generating real-world navigational cues (e.g., flashing lights, sounds, etc.) corresponding to a navigational route provided by a device-based navigational application. Thus, the present systems, methods, and other embodiments provide enhanced navigational modalities by associating real-world objects with the device-provided digital navigational aid. Rather than providing universally applied digital navigational instructions, the present navigation assistance system provides user-customized real-world navigational cues that may be based on a user profile from a navigational application. That is, the present system provides real-world navigational instructions that are based on user-specific and targeted navigational instructions from the user device of the pedestrian. In so doing, the present systems, methods, and other embodiments increase the safety of pedestrians in unfamiliar areas, reduce the anxiety of pedestrians in unfamiliar areas, and enhance pedestrian navigation systems.

FIG. 1 illustrates a navigation assistance system 100 that is associated with providing familiarity-based navigation assistance to a pedestrian 102. It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

As described above, pedestrians who are unfamiliar with an area may become anxious, stressed, or distracted as they try to navigate the new and potentially complex environment. This stress, anxiety, discomfort, and distraction may result in any number of undesirable circumstances. For example, these emotional states may compromise the mental faculties of the pedestrian and cause the pedestrian to engage in unsafe behaviors, such as crossing a road while a vehicle approaches or disregarding a pedestrian traffic light directing the pedestrian to stop. While navigation applications on a user device 104 may assist the pedestrian, the eyes of the pedestrian may be directed to the user device 104 rather than the environment. Moreover, the pedestrian 102 may have difficulty acting upon the digital instructions or identifying guiding real-world waypoints associated with the digitally presented route. As such, the navigation assistance system 100 1) provides familiarity-based navigation instructions and 2) controls infrastructure elements such as traffic lights 108, structure 110 signage, and even vehicles 106 to provide real-world navigational beacons.

In general, the navigation assistance system 100 communicates with various devices in the environment to determine whether the pedestrian 102 is unfamiliar with an area. That is, certain physical characteristics and physical movements may indicate that the pedestrian is unfamiliar with an area. Examples include elevated heart rate, elevated GSR, pacing back-and-forth, rapid eye/head movements up and down the road, conversing with a local while looking at the user device 104, and pointing in a direction. Any of this and other information that is associated with the pedestrian 102 may be collected by a variety of sensors. For example, the pedestrian 102 may be wearing a health monitoring device or carrying a user device 104 that includes a health monitoring application. In either example, the navigation assistance system 100 may communicate with the user device 104 or health monitoring device to collect this or other biometric data. As another example, objects within the environment, such as infrastructure elements (e.g., traffic lights 108) and vehicles 106, may include environment sensors such as cameras that capture images of the pedestrian 102. In this example, the navigation assistance system 100 may communicate with the infrastructure elements in the vicinity of the pedestrian 102 to receive images or other environment sensor output that depicts the pedestrian 102 from which the pedestrian's unfamiliarity with the environment may be determined.

Via the connection with the user device 104, the navigation assistance system 100 collects navigational instructions that guide the pedestrian 102 to a target destination. The navigation assistance system 100 augments these navigational instructions by providing real-world beacons that direct the pedestrian 102 along a path. The real-world beacon may take a variety of forms. For example, vehicles 106 may include external speakers or visual display panels. In this example, via the connection with the vehicle 106, the navigation assistance system 100 may provide an indication, such as an arrow, flashing light, message, or some other visual indicia to indicate where the pedestrian 102 should go to continue along the route.

As another example, the pedestrian 102 may be relying on a navigation application on a user device 104 to guide them to a restaurant. In this example, the navigation assistance system 100 may control a traffic light 108 to flash to instruct the pedestrian 102 to cross the road to reach their intended destination. As yet another example, the navigation assistance system 100 may control the signage of the restaurant to similarly flash or otherwise provide a visual indication to the pedestrian 102 that they are nearby or have reached their intended destination.

As such, the navigation assistance system 100 shares a communication path with each of these entities within the vicinity of the pedestrian 102 to 1) collect sensor data from which the level of unfamiliarity of the pedestrian 102 with the surrounding area may be determined and 2) provide control signals that control the real-world objects to guide the pedestrian 102 along their path.

As such, rather than relying on entirely digital navigation, the present navigation assistance system 100 expands navigation by providing real-world indicia of navigational waypoints that correspond to a digital route and does so based on a determined unfamiliarity of the pedestrian 102 with their surrounding environment.

Figure 2:
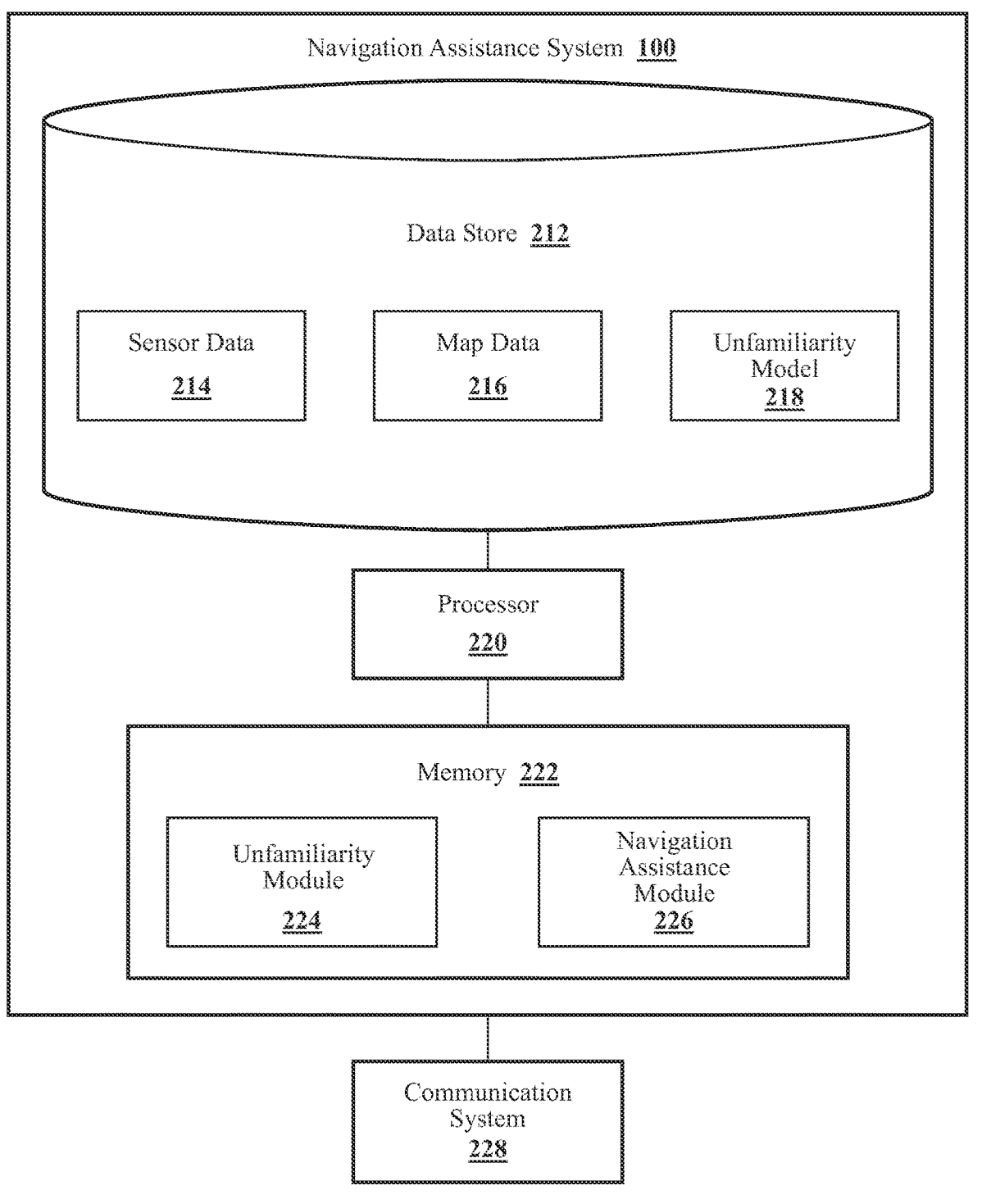
FIG. 2 illustrates one embodiment of a navigation assistance system that is associated with providing familiarity-based navigation assistance to a pedestrian.

FIG. 2 illustrates one embodiment of a navigation assistance system 100 that is associated with providing familiar-ity-based navigation assistance to a pedestrian 102. The navigation assistance system 100 is shown as including a processor 220. In one or more arrangements, the processor(s) 220 can be a primary/centralized processor of the navigation assistance system 100 or may be representative of many distributed processing units. For instance, the processor(s) 220 can be an electronic control unit (ECU). Alternatively, or additionally, the processor(s) 220 include a central processing unit (CPU), a graphics processing unit (GPU), an application-specific integrated circuit (ASIC), a microcontroller, a system on a chip (SoC), and/or other electronic processing unit.

As will be discussed in greater detail subsequently, the navigation assistance system 100, in various embodiments, may be implemented as a cloud-based service. For example, in one approach, functionality associated with at least one module of the navigation assistance system 100 is implemented within a cloud-based computing system, while further functionality is implemented with a user device 104. In other examples, the navigation assistance system 100 may be entirely disposed on a computing system remote from the environment where the pedestrian 102 is found. In this example, sensor data 214 stored at the remote server is received from user devices 104 of the pedestrian 102 and/or vehicle 106 and infrastructure elements in the vicinity of the pedestrian 102.

In any case, the navigation assistance system 100 is shown as including a processor 220. In one or more arrangements, the processor(s) 220 can be a primary/centralized processor of the navigation assistance system 100 or may be representative of many distributed processing units. For instance, the processor(s) 220 can be an electronic control unit (ECU). Alternatively, or additionally, the processor(s) 220 may include a central processing unit (CPU), an ASIC, a microcontroller, a system on a chip (SoC), and/or other electronic processing unit.

In one embodiment, the navigation assistance system 100 includes a memory 222 that stores an unfamiliarity module 224 and a navigation assistance module 226. The memory 222 is a random-access memory (RAM), read-only memory (ROM), a hard-disk drive, a flash memory, or another suitable memory for storing the modules 224 and 226. In alternative arrangements, the modules 224 and 226 are independent elements from the memory 222 that are, for example, comprised of hardware elements. Thus, the modules 224 and 226 are alternatively ASICs, hardware-based controllers, a composition of logic gates, or another hardware-based solution.

In at least one arrangement, the modules 224 and 226 are implemented as non-transitory computer-readable instructions that, when executed by the processor 220, implement one or more of the various functions described herein. In various arrangements, one or more of the modules 224 and 226 are a component of the processor(s) 220, or one or more of the modules 224 and 226 are administered on and/or distributed among other processing systems to which the processor(s) 220 is operatively connected.

Alternatively, or in addition, the one or more modules 224 and 226 are implemented, at least partially, within hardware. For example, the one or more modules 224 and 226 may be comprised of a combination of logic gates (e.g., metal-oxide-semiconductor field-effect transistors (MOSFETs)) arranged to achieve the described functions, an ASIC, programmable logic array (PLA), field-programmable gate array (FPGA), and/or another electronic hardware-based implementation to implement the described functions. Further, in one or more arrangements, one or more of the modules 224 and 226 can be distributed among a plurality of the modules 224 and 226 described herein. In one or more arrangements, two or more of the modules 224 and 226 described herein can be combined into a single module.

In one embodiment, the navigation assistance system 100 includes a data store 212. The data store 212 is, in one embodiment, an electronic data structure stored in the memory 222 or another data storage device and that is configured with routines that can be executed by the processor 220 for analyzing stored data, providing stored data, organizing stored data, and so on. Thus, in one embodiment, the data store 212 stores data used by the modules 224 and 226 in executing various functions.

The data store 212 can be comprised of volatile and/or non-volatile memory. Examples of memory that may form the data store 212 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, solid-state drivers (SSDs), and/or other non-transitory electronic storage medium. In one configuration, the data store 212 is a component of the processor(s) 220. In general, the data store 212 is operatively connected to the processor(s) 220 for use thereby. The term "operatively connected," as used throughout this description, can include direct or indirect connections, including connections without direct physical contact.

As described above, the data store 212 stores the sensor data 214, which sensor data 214 generally may include any data from which the unfamiliarity of a pedestrian 102 within an area is determined. The sensor data 214 may include data collected from a variety of sensors. For example, the sensor data 214 may include biometric data associated with the pedestrian 102. Biometric data/markers may characterize whether the pedestrian 102 is unfamiliar with an area. For example, a pedestrian 102 who is unfamiliar with an area may exhibit an elevated heart rate, an elevated GSR, elevated brain activity as measured by an EEG sensor, and oxygen saturation as measured by a near-infrared spectroscope (NIRS). As such, the sensor data 214 may include any of the aforementioned sensor data or other biometric sensor data from which the unfamiliarity module 224 may determine whether the pedestrian is unfamiliar in an area.

Such biometric data may be captured from a number of devices. For example, the pedestrian 102 may be wearing a health monitoring device that records the biometric data. In another example, the pedestrian 102 may be carrying a user device that has biometric sensors disposed thereon to monitor the health of the pedestrian 102. The biometric data may also be collected from other types of sensors carried by or worn by the pedestrian 102. For example, the user device 104 may include a microphone or camera that can capture audio or images of the pedestrian 102. Via voice signature analysis or keyword analysis, the unfamiliarity module 224 may identify the verbal communication characteristics (e.g., pitch, speed, volume, and others) and keywords or phrases that indicate pedestrian 102 unfamiliarity.

The sensor data 214 may also include biometric data for the pedestrian 102 as collected by infrastructure elements (e.g., the traffic light 108) and vehicles 106 in the vicinity of the pedestrian 102. As described above, certain physical movements may indicate a pedestrian 102 is lost, looking for something, or otherwise unfamiliar in their surroundings. Vehicles 106, traffic lights 108, and other infrastructure elements may include cameras that capture images of the pedestrian 102. From these images, the unfamiliarity module

224 identifies those physical behaviors that indicate pedestrian unfamiliarity. While particular reference is made to particular biometric data, the sensor data 214 may include other forms of biometric data.

In an example, the sensor data 214 may include historical biometric data and/or pedestrian images. That is, a determination regarding whether the pedestrian 102 is unfamiliar with an area may be based, at least in part, on a deviation of current traits/behavior from expected traits/behavior. For example, the pedestrian 102 may exhibit certain behaviors when familiar with an area, such as walking quickly, crossing streets without stopping, yielding to cyclists, focusing their gaze in front of them, etc. By comparison, when in an unfamiliar area, the pedestrian 102 may walk more slowly, hesitate when crossing a road, and look around the entire environment rather than just along their path. In this example, whether or not a pedestrian is exhibiting behavior indicative of confusion or being lost may be based on historical behaviors of the pedestrian when lost and when in an area they are familiar with.

The sensor data 214 may also include similar data for other individuals. For example, while pedestrian-specific movements/biometric markers and deviations therefrom are particularly relevant to determining whether or not the pedestrian is lost, confused, or otherwise unfamiliar with an area, pedestrian movements/biometric markers that deviate from more widely exhibited behaviors may also indicate an unfamiliarity. For example, close inspection of area maps may be a general indication of being in an unfamiliar area. As such, the sensor data 214 may include a history of biometric data and/or images/sensor output for the pedestrian 102 and other pedestrians to form baseline data against which currently compiled sensor data 214 may be compared. The unfamiliarity module 224 may rely on this comparison to classify the pedestrian 102.

In one embodiment, the data store 212 stores the sensor data 214 along with, for example, metadata that characterizes various aspects of the sensor data 214. For example, the metadata can include location coordinates (e.g., longitude and latitude), relative map coordinates or tile identifiers, time/date stamps from when the separate sensor data 214 was generated, and so on. As a particular example, the metadata may include identifying information about the pedestrian 102 to which it is associated. For example, the metadata may include a unique identifier for the pedestrian 102 or location information for the pedestrian 102.

As another example, metadata associated with vehicle or infrastructure-captured images of the pedestrian 102 may indicate the location of the subjects of the images. From this metadata, the navigation assistance system 100 may fuse data from multiple sensors. That is, location metadata from the user device sensor data and location metadata from the environment sensor data may be matched such that the unfamiliarity module 224 may perform a more complete assessment of sensor data associated with the pedestrian 102. While one example is presented herein for linking data collected from disparate systems (e.g., a vehicle/infrastructure element and a biometric sensor for the pedestrian 102), other systems may be implemented to associate the sensor data with the pedestrian 102. For example, the pedestrian 102 captured by the camera of a vehicle may be identified via facial recognition and linked to biometric sensor data via a pedestrian profile. In any case, as a result of the linking, the sensor data 214, in one embodiment, represents a combination of perceptions of the pedestrian 102 acquired from multiple sensors.

In an example, the unfamiliarity module 224 may process this metadata to determine pedestrian unfamiliarity. That is, hardware components of the user device 104, such as a GPS device, track the location and pattern of movements of the pedestrian 102. As such, this location metadata may be used to determine when the pedestrian 102 is in a location they have never been. As such, the metadata portion of the sensor data 214 may indicate the unfamiliarity of the pedestrian 102 in their surroundings.

As the navigation assistance system 100 communicates with various remote devices (i.e., the user device 104, vehicle 106, and infrastructure elements) to receive the sensor data 214, the navigation assistance system 100 functions in cooperation with a communication system 228. In one embodiment, the communication system 228 communicates according to one or more communication standards. For example, the communication system 228 can include multiple different antennas/transceivers and/or other hardware elements for communicating at different frequencies and according to respective protocols. The communication system 228, in one arrangement, communicates via a communication protocol, such as a WiFi, dedicated short-range communication (DSRC) or another suitable protocol for communicating between the entities in the cloud environment. Moreover, the communication system 228, in one arrangement, further communicates according to a protocol, such as global system for mobile communication (GSM), Enhanced Data Rates for GSM Evolution (EDGE), Long-Term Evolution (LTE), 5G, or another communication technology that provides for the navigation assistance system 100 to communicate with the various devices described herein. In any case, the navigation assistance system 100 can leverage various wireless communication technologies to provide communications to other entities, such as members of the cloud-computing environment. Additional detail regarding the communication network is provided below in connection with FIG. 3.

In one embodiment, the data store 212 further includes map data 216. The map data 216 includes, in at least one approach, maps of one or more geographic areas. In some instances, the map data 216 can include information about roads (e.g., lane and/or road maps), traffic control devices, road markings, structures, features, and/or landmarks in one or more geographic areas. In at least one approach, the map data 216 may be characterized as a high-definition (HD) map that provides information for navigation assistance.

The data store 212 further includes an unfamiliarity model 218, which may be relied on by the unfamiliarity module 224 to determine whether the pedestrian 102 is unfamiliar with their surroundings. In an example, the navigation assistance system 100 may be a machine-learning system that identifies patterns and/or deviations based on previously unseen data. In the context of the present application, a machine-learning navigation assistance system 100 relies on some form of machine learning to infer whether the pedestrian 102 is unfamiliar with their surroundings based on the observed characteristics of the pedestrian 102 (i.e., biometric data and/or images of the pedestrian 102). In any case, the unfamiliarity model 218 includes the weights (including trainable and non-trainable), biases, variables, offset values, algorithms, parameters, and other elements that operate to output a classification of the pedestrian 102 as unfamiliar or familiar with their surrounding environment based on sensor data 214.

The navigation assistance system 100 also includes an unfamiliarity module 224 which, in one embodiment, includes instructions that cause the processor 220 to determine that the pedestrian 102 is in an unfamiliar area based on sensor data 214 that characterizes the pedestrian 102. As described above, certain physiological characteristics and physical behaviors may indicate that the pedestrian 102 is in an unfamiliar area. The unfamiliarity module 224 analyzes the sensor data 214 to identify when the pedestrian 102 exhibits the physiological characteristics and physical behaviors indicative of being unfamiliar and uses such to classify the pedestrian 102 as in an unfamiliar area such that appropriate remedial actions may be executed.

As described in greater detail below, the classification of the pedestrian 102 may be based on the deviations of the current characteristics/behavior of the pedestrian 102 from previously collected sensor data 214 associated with the pedestrian 102 being in an area they are familiar with. Similarly, the classification of the pedestrian 102 may be based on similarities of the current characteristics/behavior of the pedestrian 102 to previously collected sensor data 214 associated with the pedestrian being in an unfamiliar area. That is, the pedestrian may exhibit certain behaviors when in a familiar area and other certain behaviors when in an unfamiliar area. As described above, the sensor data 214 includes historical sensor data 214 for the pedestrian in both scenarios (e.g., in an unfamiliar area and a familiar area), which historical data may be referred to as baseline data and may reflect the historical patterns of those for whom it is collected. The unfamiliarity module 224 may compare currently collected sensor data 214 to historical sensor data 214 (of the pedestrian 102 and/or additional individuals) to identify similarities and deviations from unfamiliarity-indicating baseline data and familiarity-indicating baseline data, respectively.

As such, the unfamiliarity module 224 may include instructions that cause the processor 220 to analyze biometric sensor data to identify biometric markers indicating that the pedestrian 102 is unfamiliar in an area. For example, the unfamiliarity module 224 may cause the processor 220 to receive biometric sensor data, compare such against a threshold or baseline data, and classify such as abnormal.

In an example, the unfamiliarity module 224 includes an image processor that analyzes and characterizes pedestrian 102 movements. The image processor of the unfamiliarity module 224 may analyze the images to identify the pedestrian 102 and perform image analysis/object recognition and tracking to determine when the pedestrian 102 performs those movements that are indicative of unfamiliarity. For example, image analysis may indicate that the pedestrian has remained at an intersection for multiple light cycles while repeatedly looking up and down a street, looking at their user device 104, and conversing with bystanders. Each detected movement may indicate that the pedestrian 102 is unfamiliar in this area. As such, the unfamiliarity module 224 identifies these behaviors in the image data and relies on such to determine whether the pedestrian 102 is in an unfamiliar area.

As described above, determining area unfamiliarity may be based on deviations from previous and expected behavior. As such, the image processor may compare currently-collected images of the pedestrian 102 to historical images of the pedestrian 102 and/or other pedestrians to identify differences in the physical behaviors and movements of the pedestrian 102. For example, currently collected sensor data 214 may indicate that the pedestrian 102 is walking more slowly than expected (as defined by the baseline sensor data for the pedestrian 102 when in a familiar area) and is holding their phone in front of their face as they slowly rotate in place in an attempt to orient the navigation application, which may be similar behavior to other instances when the pedestrian 102 is in an unfamiliar area as defined by the baseline sensor data.

Note that while particular reference is made to determining that the pedestrian 102 is unfamiliar with an area based on a few instances of sensor data 214, it may be that a single movement or biometric characteristic of the pedestrian 102 is insufficient to generate a classification with a threshold level of confidence. As such, the unfamiliarity module 224 may consider multiple instances of sensor data 214 to generate a classification.

In one approach, the unfamiliarity module 224 implements and/or otherwise uses a machine learning algorithm to analyze the sensor data 214 and identify differences/similarities between such and the baseline data. Additional detail regarding the machine-learning navigation assistance system 100 is provided below in connection with FIG. 7.

The navigation assistance system 100 further includes a navigation assistance module 226 which, in one embodiment, includes instructions that cause the processor 220 to 1) acquire a navigational instruction presented on a user device 104 of the pedestrian 102 and 2) present navigational assistance on an electronic display device in a vicinity of the pedestrian 102 responsive to an indication that the pedestrian 102 is in an unfamiliar area. That is, as described above, digitally presented navigational instructions may be challenging to follow for various reasons. The navigation assistance module 226 provides additional navigational aid by controlling various real-world electronic display devices to guide the pedestrian 102.

In operation, the navigation assistance module 226 receives the navigational instruction from the user device 104. That is, via a navigation application on a user device 104, a pedestrian 102 may input a target destination. Relying on the location of the target destination, the map data of the user device 104, and data from a GPS or other location-identifying hardware component of the user device 104, the navigation application may generate a route from the current location of the pedestrian 102 to the target destination. The navigation assistance system 100 may receive this route via the communication system 228.

The navigation assistance module 226 may identify physical objects such as vehicles 106, infrastructure elements such as traffic lights 108, and structures 110 with electronic display devices along the route. That is, via the map data 216 and/or the cloud-based communication system 228, the navigation assistance module 226 may determine the location of these different objects (e.g., the coordinates). Based on the identified locations of these objects, the navigation assistance module 226 may determine whether any are along the navigational route. For example, the navigation assistance module 226 may compare the coordinates of the objects in the environment with those of the route to determine whether such are within a threshold distance of one another.

The navigation assistance module 226 may also identify whether the objects have electronic display devices that are remotely accessible and controllable. For example, a vehicle 106 may have an electronic display that a controller of the vehicle 106 manages. The vehicle 106 may include a communication system such as a wireless transceiver that facilitates communication of the vehicle 106 with the navigation assistance system 100. In this example, the navigation assistance system 100 may establish a communication (e.g., Wi-Fi, cellular, or other wireless network connection) path with the vehicle 106 such that a vehicle-presented navigational beacon may be generated.

Similarly, infrastructure elements such as traffic lights 108 and structures 110 may include electronic display devices that controllers manage. These controllers may include communication system(s) such as wireless transceivers that facilitate communication of the respective agent with the navigation assistance system 100. In this example, the navigation assistance system 100 may establish a communication (e.g., Wi-Fi, cellular, or other wireless network connection) path with the infrastructure elements and structures to generate navigational beacons.

In any case, the navigation assistance system 100 may initiate a handshake process wherein identifying information of the entities to communicate (e.g., vehicle 106, infrastructure element, structure 110, and the navigation assistance system 100) is shared. Responsive to the request, the target entity with the external display device may authenticate and authorize the navigation assistance system 100 to control, at least in part, the external display device to provide navigational assistance.

The form of the navigational assistance may be of various forms and may depend on the object on which it is presented. For example, with reference to FIG. 1, a vehicle 106 may include an exterior display panel on which a message, symbol, or other indicia may be presented. As another example, a traffic light 108 may include lights that could flash and indicate the route the pedestrian 102 should follow to reach an intended destination. As yet another example, signage of the structure 110, which may be the target destination of the route, may flash to catch the attention of the pedestrian 102. Note that while particular reference is made to particular navigational assistance, the navigation assistance module 226 may generate other route-indicating indicia for pedestrian guidance.

As such, the navigational assistance system 100 controls exterior display devices of real-world objects (e.g., vehicles 106, infrastructure elements, and structures 110) along a route of the pedestrian 102 to guide the pedestrian 102. Accordingly, the navigation assistance system 100 of the present specification provides enhanced pedestrian navigation by proactively determining whether the pedestrian 102 is in an area where increased navigational instruction may be desired. That is, the navigation assistance system 100 provides enhanced perception of the pedestrian state, where such systems may be unable to do so. Moreover, the navigation assistance system 100 transforms the navigational instructions of a user device 104 to real-world navigational assistance in the form of real-world visual indicia of the navigational route.

Figure 3:
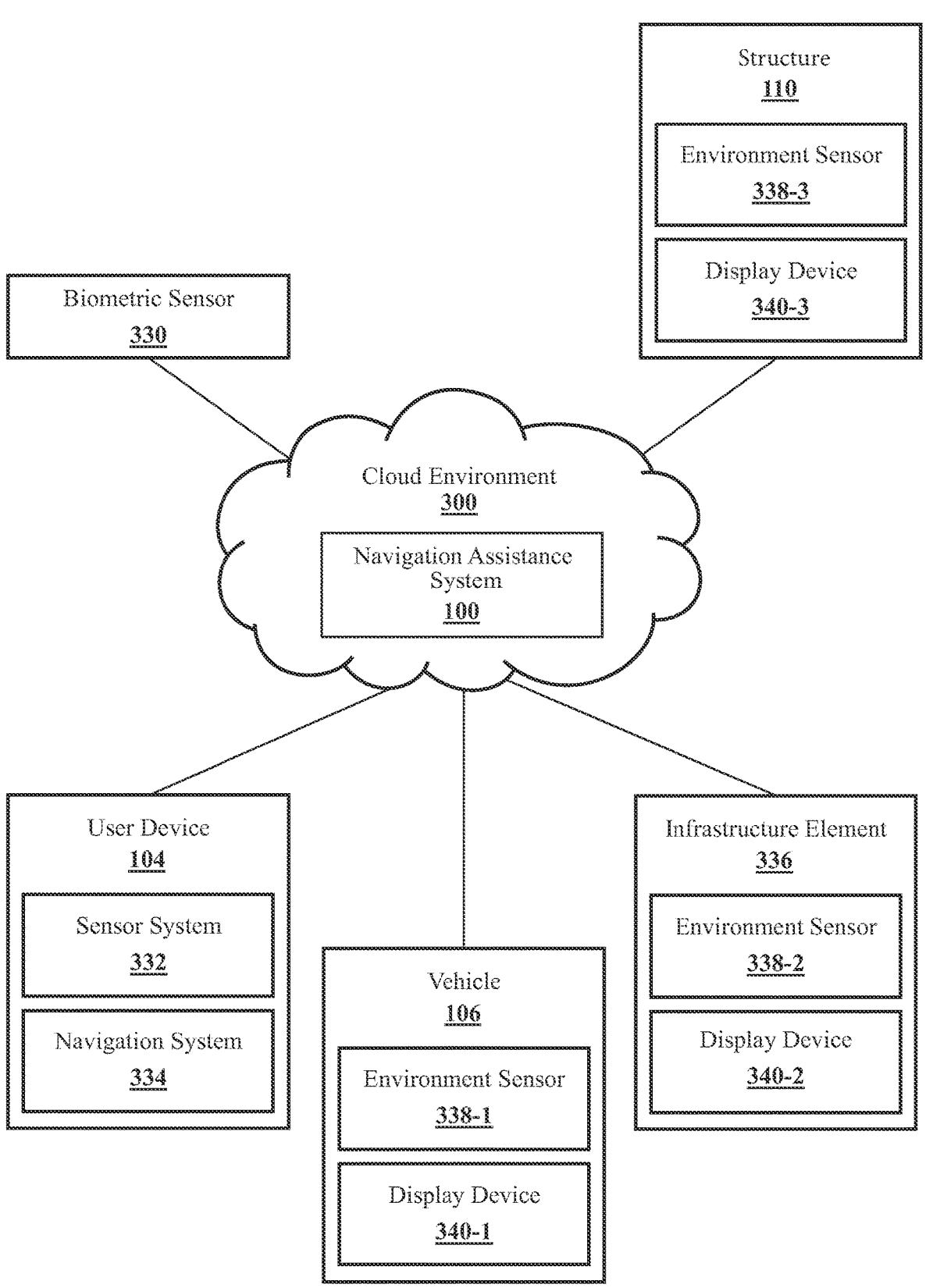
FIG. 3 illustrates one embodiment of the navigation assistance system of FIG. 2 in a cloud-computing environment.

FIG. 3 illustrates one embodiment of the navigation assistance system 100 of FIG. 2 in a cloud-computing environment 300. In one or more approaches, the cloud environment 300 may facilitate communications between various sensor-collecting devices and display devices 340 along the route of the pedestrian 102 towards a target destination. Specifically, in various embodiments, the navigation assistance system 100 communicates with other devices through a cloud-based service to 1) determine whether or not the pedestrian 102 is unfamiliar with an area and 2) transmit control signals that alter the operation of various objects in the environment of the pedestrian 102 to guide the pedestrian along a route.

The cloud-based environment 300 may be a dynamic environment comprising cloud members routinely migrating into and out of a geographic area. As it relates to this particular system, network membership may change based on the movement of the vehicles 106 and the pedestrian 102. That is, as vehicles 106 and pedestrians 102 come within a threshold distance of one another and stationary objects such as infrastructure elements 336 and structures 110, a wireless communication path in whatever form may be established between the navigation assistance system 100 and the various devices. Specifically, the navigation assistance system 100 may initiate a handshake operation where the different communicating entities establish a wireless communication link to transmit data between them. Various wireless communication paths, such as Wi-Fi, cellular, or other wireless-based network connections, may be established.

Once a connection is established, data may be transferred between the different entities and the navigation assistance system. Specifically, a biometric sensor 330 worn or carried by the pedestrian 102 may transmit biometric data to the navigation assistance system. Examples of biometric sensors 330 include EEG sensors, NIRS sensors, GSR sensors, and heart rate sensors. Similarly, the user device 104 may include a sensor system 332, which captures biometric information of the pedestrian 102. Examples of such user device sensor system 332 sensors include cameras and microphones.

As described above, the vehicle(s) 106, infrastructure element(s) 336, and structure(s) 110 in the vicinity of the pedestrian 102 may include environment sensors 338-1, 338-2, and 338-3, respectively, that sense a surrounding environment (e.g., external). As an example, in one or more arrangements, the environment sensors 338 include one or more radar sensors, one or more LiDAR sensors, one or more sonar sensors (e.g., ultrasonic sensors), and/or one or more cameras 12 (e.g., monocular, stereoscopic, RGB, infrared, etc.). As described above, the environment sensors 338 capture physiological indicators of unfamiliarity such as movement patterns, facial movements/traits, and eye movements/traits that are used by the unfamiliarity module 224 to determine whether the pedestrian 102 is in an area they are unfamiliar with.

Moreover, via the communication system 228, the navigation assistance system 100, and more specifically, the navigation assistance module 226, may transmit control signals to infrastructure elements 336, structures 110, vehicles 106, or other targets with electronic display devices 340. That is, as described above, vehicles 106, infrastructure elements 336, and structures 110 may include display devices 340-1, 340-2, and 340-3 that are remotely controllable to display a message to the pedestrian 102. The navigation assistance system 100 establishes a wireless connection with various devices along the route and the respective display devices 340, such that navigational assistance may be displayed thereon.

In an example, the user device 104 includes a navigation system 334 that can provide navigational instructions to the pedestrian 102. That is, the navigation system 334 can include one or more devices, applications, and/or combinations thereof to determine the geographic location of the user device 104/pedestrian 102 and/or to determine a travel route for the user device 104/pedestrian 102. The navigation system 334 can include one or more mapping applications to determine a travel route for the user device 104/pedestrian 102 according to, for example, the map data of the user device 104. The navigation system 334 may include or at least provide a connection to a global positioning system, a local positioning system, or a geolocation system.

As described above, the navigation assistance system 100 receives this travel route and identifies vehicle(s) 106, infrastructure element(s) 336, and structure(s) 110 along the travel route. Responsive to an established wireless connection of one of these entities along the travel route, the navigation assistance system 100 sends a control signal to activate the respective display device 340 to provide real-world physical indicia of the travel route.

Figure 4:
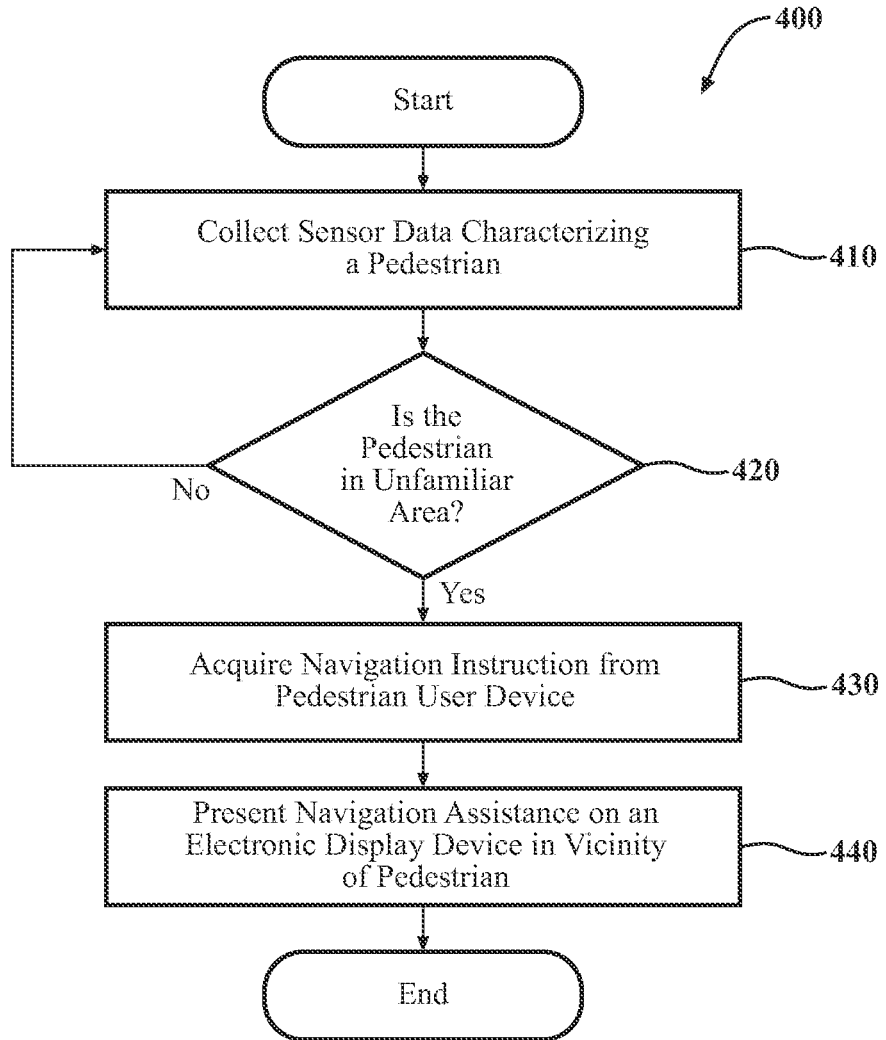
FIG. 4 illustrates a flowchart for one embodiment of a method that is associated with providing familiarity-based navigation assistance to a pedestrian.

Additional aspects of providing real-world navigation beacons will be discussed in relation to FIG. 4. Method 400 will be discussed from the perspective of the navigation assistance system 100 of FIGS. 1 and 2. While method 400 is discussed in combination with the navigation assistance system 100, it should be appreciated that the method 400 is not limited to being implemented within the navigation assistance system 100 but is instead one example of a system that may implement the method 400.

At 410, the navigation assistance system 100 may collect the sensor data 214 from the number of devices, including a biometric sensor 330, a sensor system 332 of a user device 104, and environment sensors 338 of elements within the area, including vehicle(s) 106, infrastructure element(s) 336, and structure(s) 110. As described above, the sensor output data may indicate whether the pedestrian 102 is familiar with an environment. As such, the navigation assistance system 100 controls any of these or other sensors to observe the pedestrian.

Moreover, in further embodiments, the navigation assistance system 100 controls the sensors to acquire the sensor data 214 at successive iterations or time steps. Thus, the navigation assistance system 100, in one embodiment, iteratively executes the functions discussed at blocks 410-420 to acquire the sensor data 214 and provide information therefrom. Furthermore, the navigation assistance system 100, in one embodiment, executes one or more of the noted functions in parallel for separate observations in order to maintain updated perceptions.

Additionally, as previously noted, the navigation assistance system 100 fuses the data from multiple sensors to provide a more complete data set of the physiological characteristics/traits and movement behaviors of the pedestrian 102.

As described above, the unfamiliarity module 224 may process metadata associated with the sensor data 214 to map the sensor data to the pedestrian 102. In one example, the unfamiliarity module 224 associates the sensor data 214 to the pedestrian 102 based on image analysis. Specifically, the unfamiliarity module 224 may employ facial recognition on the images captured by the user device 104 camera, and environment sensors 338 of the vehicle(s) 106, infrastructure element(s) 336, and structure(s) 110 to identify the pedestrian 102 in a captured image. The captured images may then be tagged with an identifier of the pedestrian 102. In an example, the unfamiliarity module 224 may associate detected user movements in an image with the individuals who performed them. Accordingly, any identified movements of the pedestrian 102 within an image may be tagged as those of the pedestrian 102.

Other or similar identifying metadata may be associated with collected biometric data or images captured by a user device 104 of the pedestrian 102. For example, the pedestrian 102 may have a profile associated with a biometric sensor 330 (whether on a health monitoring device or a health monitoring application on the user device 104) and/or the user device 104. As such, any biometric data collected by the biometric sensor 330 or images/audio captured by the user device 104 may be associated with the pedestrian 102.

In another example, the metadata associated with collected sensor data 214 indicates the precise coordinates of the pedestrian 102. That is, the biometric sensor 330 and/or the user device 104 may include location-based systems that record the location of the pedestrian 102 and generate location-identifying metadata associated with the respective output. The metadata associated with images captured by the vehicles 106, the infrastructure elements 336, and the structures 110 may also include metadata from which an exact location of the pedestrian 102 may be determined. For example, the metadata may indicate the coordinates of the source of the image (e.g., the vehicle 106, the infrastructure element 336, or the structure 110). In this example, the image processor of the unfamiliarity module 224 may consider these source coordinates as the location of the pedestrian 102. In another example, the image processor of the unfamiliarity module 224 may calculate more precise coordinates of the pedestrian 102 within the image based on the source coordinates. For example, via image processing, the unfamiliarity module 224 may estimate a distance between the pedestrian 102 and the image source and generate estimated pedestrian coordinates based on the known source coordinates.

Note that while particular reference is made to particular operations for associating certain collected sensor data 214 with the pedestrian 102, the unfamiliarity module 224 may rely on other mechanisms to make this determination. In any case, the navigation assistance system 100 processes metadata that associates the collected sensor data 214 with the subject of monitoring (e.g., the pedestrian 102). As the self-collected data (e.g., from the biometric sensor 330 and/or the user device 104 of the pedestrian 102) and remotely-collected data (e.g., images from the vehicles 106, infrastructure elements 336, and structures 110) both include pedestrian identifying metadata, the navigation assistance system 100 can fuse the respective data to provide a more complete representation of the pedestrian's area familiarity.

At 420, the unfamiliarity module 224 determines whether the pedestrian is unfamiliar with the area they are found based on the sensor data 214 that characterizes the pedestrian 102. That is, the unfamiliarity module 224 receives sensor data 214 and determines from such whether or not the pedestrian 102 is exhibiting those characteristics and movements that are evidence that the pedestrian 102 is unfamiliar with their surroundings. As described above, many biometric markers indicate that the pedestrian 102 is unfamiliar with their surroundings. There are also physical behaviors that are indicative of the pedestrian 102 being lost or unfamiliar in an area. For example, a pedestrian 102 that is lost may switch between looking down at their user device 104 (e.g., at a navigation application) and looking up and around for street signs or other geographic indicia indicated on their user device 104 map. As another example, the pedestrian 102 who is lost at an intersection, may rotate in place multiple times, suggesting they are trying to decide which road of the intersection to travel. As another example, a pedestrian 102 repeatedly chatting with others in the area may indicate that the pedestrian 102 is lost and asking locals for directions. Other physical behaviors/movements that may indicate that the pedestrian 102 is unfamiliar with a region include peering for long periods down streets and looking in other directions, placing hands on hips, repeated cycles of looking in a direction and turning around, etc.

In addition to biometric data and physical behaviors/movements, additional data may indicate that the pedestrian 102 is in an unfamiliar area. As described above, a user device 104 may include location-based systems that indicate the location (e.g., the coordinates of the user device 104) of the user device 104. In this example, the sensor data 214 may include a record of the locations the user device 104 has traveled to. In this example, the unfamiliarity module 224 may consider the history of recorded locations to determine whether the user device 104 and pedestrian 102 are in a new area or whether the pedestrian 102 is within a threshold distance of an area they are familiar with.

In any case, the unfamiliarity module 224 receives the biometric sensor data, whether such is an independent biometric sensor 330 (e.g., a wearable health monitoring device) or a part of a sensor system 332 of a user device 104, and images or other perception sensor output from a sensor of the sensor system 332 of the user device 104 and/or environment sensors of vehicles 106, infrastructure elements 336, and structures 110 in the vicinity of the pedestrian 102. As such, the unfamiliarity module 224 includes instructions that cause the processor 220 to assess at least one of the biometric data for the pedestrian, images of the pedestrian, and location-based sensor data of the user device 104.

As described above, in some examples, evaluation of the sensor data 214 may include comparing currently measured sensor data 214 to historic sensor data, otherwise referred to as baseline data. That is, the movements and biometric characteristics of a lost pedestrian 102 may differ from those of the pedestrian 102 when not lost and navigating a familiar area. As such, the unfamiliarity module 224 may receive the baseline data, identify patterns in such, and compare and contrast the currently measured sensor data 214 to the baseline data to identify 1) similarities between the currently measured sensor data 214 and baseline data tagged as identifying the pedestrian 102 in an unfamiliar area and 2) differences between the currently measured sensor data 214 and baseline data tagged as identifying the pedestrian 102 as navigating an area they are familiar with. As described below in connection with FIG. 7, in some examples, the determination regarding whether the pedestrian 102 is in an unfamiliar area may be based on machine-learning analysis of the baseline data and the currently measured sensor data 214.

If the uncertainty module 224 determines that the pedestrian 102 is not exhibiting those characteristics and behaviors indicative of a lack of familiarity with an area, then the navigation assistance system 100 continues monitoring sensor data 214. If the pedestrian 102 is in an unfamiliar area, then at 430, the navigation assistance module 226 acquires a navigational instruction presented on a user device 104 of the pedestrian 102. As described above, a user device 104 may include a navigation system 334 that generates a travel route for the pedestrian 102 from a current location of the pedestrian 102 to a target destination. From this navigational instruction, the navigation assistance system 100 identifies display devices 340 along the route onto which navigational assistance may be provided. Accordingly, the navigation assistance module 226 receives the travel route and metadata associated with the route, such as coordinates of different waypoints along the route.

As another example, the navigation assistance module 226 may receive specific user settings/parameters associated with the operation of the navigational application. For example, the pedestrian 102 may have certain preferences regarding route calculation, such as staying near parks and other green spaces and avoiding roads where vehicles travel at high speeds. These and other preferences may be stored in the navigation application settings. Accordingly, by retrieving a navigation instruction from a user device 104, the navigation assistance provided by the display devices 340 on the vehicles 106, infrastructure elements 336, and structures 110 is user-specific rather than a generically provided navigation aid. As such, the present navigation assistance system provides customized real-world navigation beacons that may be based on specific user-designated navigational preferences.

At 440, the navigation assistance module 226 presents navigational assistance on electronic display device(s) 340 in the vicinity of the pedestrian 102, which navigational assistance is based on the navigational instruction. That is, as described above, based on the movement of the pedestrian 102, and in some examples a vehicle 106, different entities in a cloud environment 300 may be within a threshold distance of the pedestrian, which threshold distance may be a viewing distance of the pedestrian 102. When within the threshold distance, the navigation assistance system 100 may establish a wireless communication link with entities with remotely controllable display devices 340, as identified and described above. The navigation assistance system 100 may then identify those entities that are along the route, which identification may be based on a comparison of the location (e.g., coordinates) of the entity and coordinates along the route. If an entity is along the route and has a remotely controllable display device 340, the navigation assistance system 100 negotiates with the entity to present a navigation beacon on the display device 340. As such, the navigation assistance module 226 includes instructions that cause the processor 220 to present the navigational assistance on an electronic display device 340-2 of an infrastructure element 336, or an exterior electronic display device 340-1 of a vehicle 106 in the vicinity of the pedestrian 102.

The navigational beacon may take a variety of forms. For example, the navigational beacon may be a message/symbol displayed on the external display panel of a vehicle 106. In another example, the navigational beacon may be a flashing light on a vehicle 106, infrastructure element 336, or structure 110. As one particular example, the navigational assistance system 100 may, when the pedestrian 102 is within a certain distance of a target structure 110, control signage of the structure 110 to flash as an indicator to the pedestrian 102.

In any case, the navigation assistance module 226 includes instructions that may cause the processor 220 to indicate, on the user device 104, a format of the navigational assistance to be presented on the electronic display device 340. For example, the navigation assistance module 226 may present a message on the user device 104, which indicates characteristics of the navigation beacon, for example indicating the beacon as a symbol/message on a vehicle or a flashing light. As a specific example, a navigational instruction on the user device 104 may state, "head towards a flashing traffic light 108" or "a sign of your intended destination is now flashing."

In some examples, the navigation beacon is activated based on the gaze of the pedestrian 102. As described above, cameras in the area, or cameras on the user device 104, may detect the pedestrian's eyes and the gaze direction of the eyes. In this example, based on gaze direction information extracted from images of the pedestrian 102, the navigation assistance module 226 may identify those entities in the real-world environment that are 1) along the travel route and 2) are the subject of the pedestrian's attention and activate such to provide a beacon along the route. As such, the navigation assistance module 226 and/or the unfamiliarity module 224 may include instructions that cause the processor 220 to detect a gaze direction of the pedestrian 102 and present the navigational beacon on an electronic display device 340 in the gaze direction of the pedestrian 102.

In summary, the navigation assistance system 100 and method 400 described herein enhance pedestrian 102 navigation by generating real-world navigational beacons based on navigational instructions on a user device 104 such that the user may more easily navigate the physical world based on digital navigational instructions. The navigation assistance system 100 controls real-world entities to provide user-specific navigation along a device-determined travel route.

Figure 5:
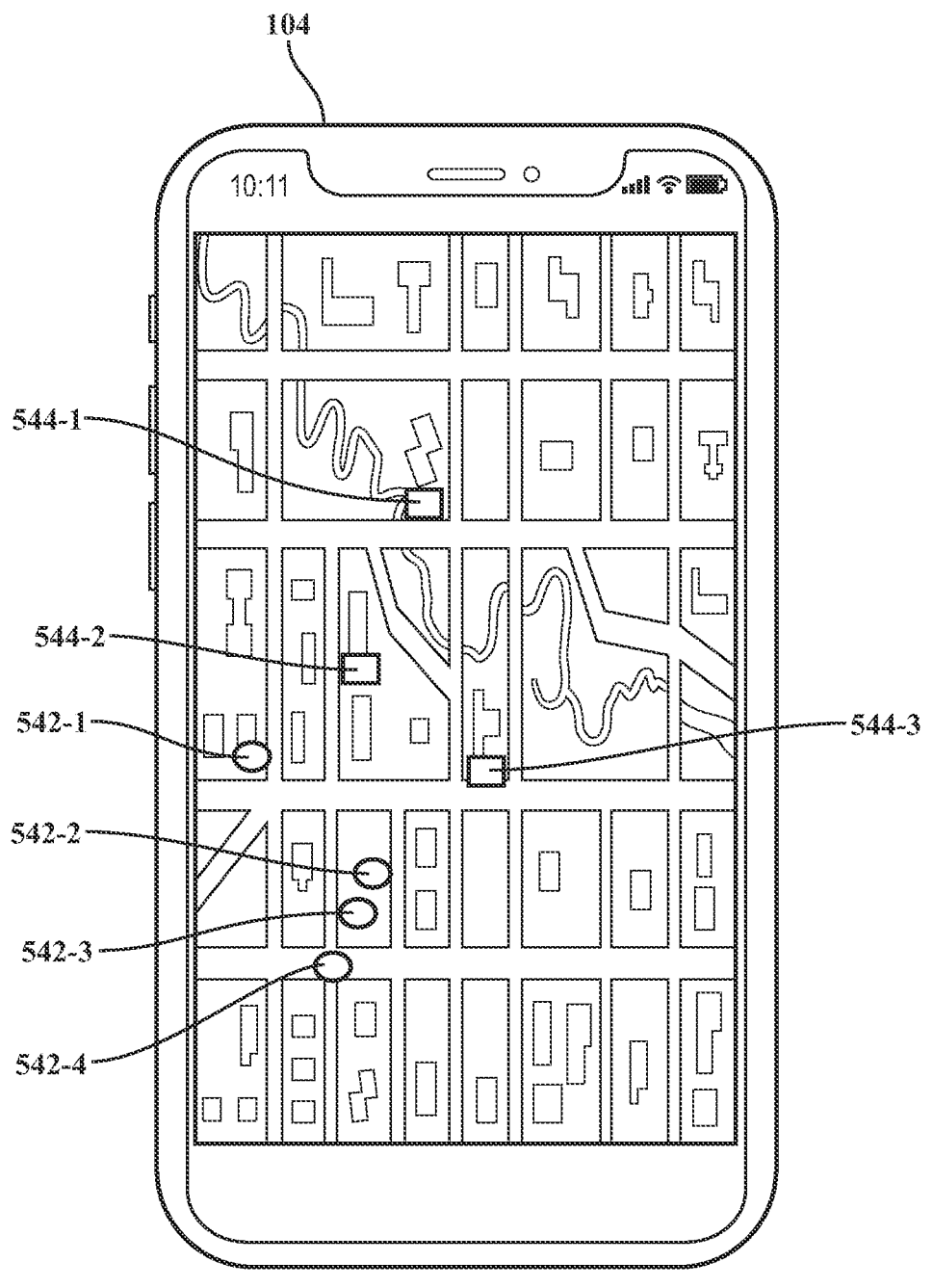
FIG. 5 illustrates the identification of establishments and pedestrians that may be familiar to the pedestrian.

FIG. 5 illustrates the identification of establishments 544-1, 544-2, and 544-3 or individuals 542-1, 542-2, 542-3, and 542-4 that may be familiar to the pedestrian 102. Specifically, when navigating an unfamiliar area, the pedestrian 102 may be put at ease if they can interact with stores, restaurants, or people they are familiar with. For example, if a pedestrian 102 frequents a particular dining establishment, seeing and/or eating at that dining establishment in an unfamiliar area may provide the pedestrian 102 with a sense of comfort and peace. As another example, if traveling in an area where the locals speak a different language than the pedestrian 102, the pedestrian 102 may be more comfortable and able to ask directions from a local who speaks the native language of the pedestrian 102. As such, the navigation assistance module 226 may identify those establishments 544 or individuals 542 on a map of the user device 104.

The identification of these establishments 544 and individuals 542 may take a variety of forms. For example, via the communication system 228, the navigation assistance system 100 may establish a communication link with the user device 104 of the pedestrian 102. Through this communication link, the navigation assistance system 100 may receive profile information for the pedestrian 102, such as demographic information (i.e., languages spoken, residence) from a variety of sources, including social media profiles, social media postings, user device 104 profile information, internet browsing history, or any other of a variety of sources. From this profile-based information, the navigation assistance module 226, in some examples using machine-learning, may identify those establishments that the pedestrian 102 frequents or is otherwise familiar with and place markers for those establishments 544 on the map of the user device 104. As such, the navigation assistance module 226 includes instructions that cause the processor 220 to 1) collect profile information for the pedestrian 102 that indicates an establishment 544 with which the pedestrian 102 is familiar and 2) present a location of the establishment 544 in the unfamiliar area on a map of the user device 104.

In a similar fashion, the navigation assistance module 226 may identify other individuals 542 that the pedestrian 102 may be familiar with or comfortable with. As described above, a pedestrian 102 may feel more comfortable asking for directions from a local who shares a profile characteristic with the pedestrian 102. As specific examples, the pedestrian 102 may feel more comfortable talking with a local who speaks the same language as the pedestrian 102, has the same profession as the pedestrian 102, or who may be familiar with the pedestrian's residence. As such, the navigation assistance module 226 may include instructions that cause the processor 220 to collect profile information for the pedestrian 102 and profile information for other individuals 542, the profile information indicating a profile characteristic (e.g., language spoken, occupation, and residence, among others) for the pedestrian 102 and the other individual 542 and to identify, on the user device 104, an individual 542 in the unfamiliar area that shares a profile characteristic with the pedestrian 102. While particular reference is made to particular modalities for acquiring profile information and particular types of information included in such, the navigation assistance module 226 may acquire these or different types of profile information using different modalities to identify establishments 544 and/or individuals 542 the pedestrian 102 may be comfortable with to alleviate discomfort associated with being in a new and unfamiliar area. In an example, the pedestrian 102 and other individuals 542 may opt out of providing profile information from which user preferences and profile characteristics are identified.

Figure 6:
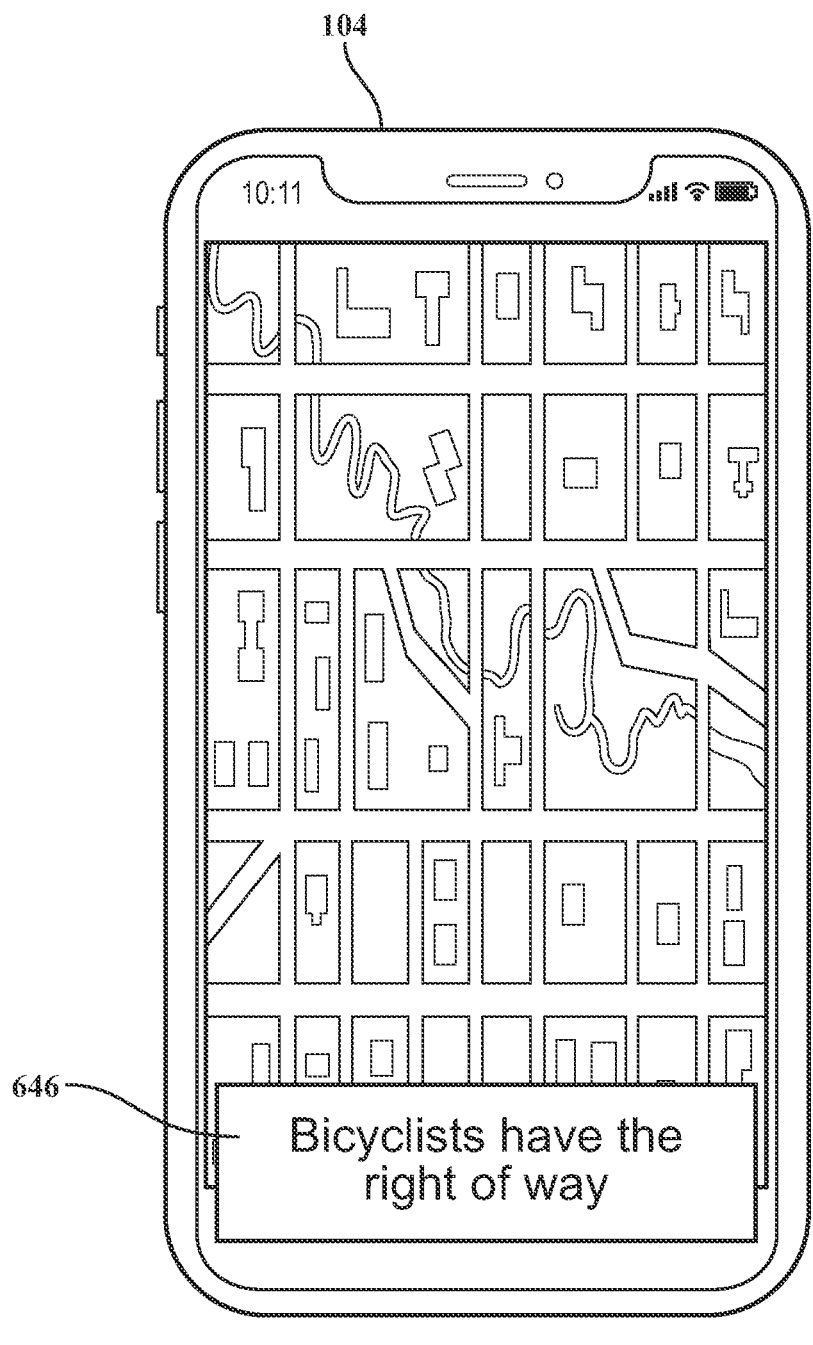
FIG. 6 illustrates the presentation of region-specific navigation assistance to the pedestrian.

FIG. 6 illustrates the presentation of region-specific navigation assistance to the pedestrian 102. In some cases, the unfamiliar area where the pedestrian 102 is found may have different road cultures and traffic regulations from areas with which the pedestrian 102 is familiar. For example, in some areas, the road culture dictates that pedestrians have the right of way and users of other forms of transportation (e.g., bicyclists and motorists) yield to the pedestrians. In other areas, it may be the case that other forms of transportation, such as bicyclists, have the right of way, and pedestrians are expected to yield. A lack of knowledge of these and other traffic regulations may place the pedestrian 102 in risky, dangerous, or uncomfortable situations. As such, in this example, the navigation assistance module 226 may generate a notification 646 of particular traffic regulations or other road culture assistance to reduce the stress/discomfort the pedestrian may associate with traveling in unfamiliar areas.

Specifically, via the communication system 228, the navigation assistance system 100 may determine travel regulations that pertain to the unfamiliar area, for example by receiving information from websites, forums, blog posts, social media pages, social media posts, articles, etc. associated with the unfamiliar area. As such, the navigation assistance module 226 includes instructions that cause the processor 220 to determine travel regulations that pertain to the unfamiliar area and present the travel regulations on the user device 104.

Figure 7:
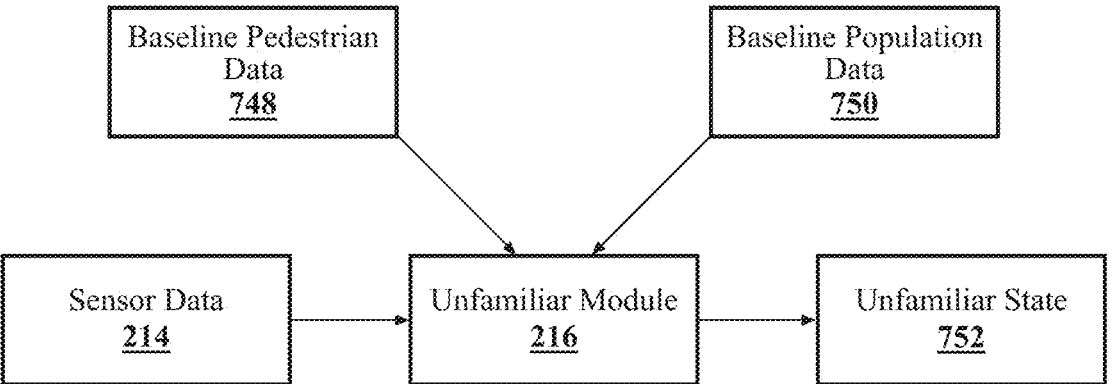
FIG. 7 illustrates one embodiment of a machine learning navigation assistance system that is associated with providing familiarity-based navigation assistance to a pedestrian.

FIG. 7 illustrates one embodiment of a machine learning navigation assistance system 100 that is associated with providing familiarity-based navigation assistance to a pedestrian 102. Specifically, FIG. 7 depicts the unfamiliarity module 224 that generates an indication of an unfamiliar state 752 for the pedestrian 102, which indication may trigger the generation of real-world navigational beacons and/or additional navigation assistance. It should be appreciated that the unfamiliarity module 224, in combination with the unfamiliarity model 218, can form a computational model such as a neural network model. In any case, the unfamiliarity module 224 implements functional aspects of the unfamiliarity model 218 while further aspects, such as learned weights, may be stored within the data store 212. Accordingly, the unfamiliarity model 218 is generally integrated with the unfamiliarity module 224 as a cohesive, functional structure.

A machine-learning algorithm generally identifies patterns and deviations of previously unseen data from the patterns. In the context of the present application, a machine-learning unfamiliarity module 224 relies on some form of machine learning, whether supervised, unsupervised, reinforcement, or any other type of machine learning, to 1) identify patterns in pedestrian 102 and other individual's behavior when in a familiar area and 2) identify patterns in pedestrian 102 and other individual's behavior when in an unfamiliar area. The machine-learning system infers whether the pedestrian 102 is in an unfamiliar or familiar area based on comparing the currently collected sensor data 214 to historical patterns for the pedestrian 102 and/or other pedestrians (i.e., baseline data).

As described above, the unfamiliarity module 224 may rely on baseline data to infer the unfamiliar state 752 of the pedestrian 102. Specifically, the unfamiliarity module 224 includes instructions that cause the processor 220 to compare the sensor data 214 to baseline data, where the baseline data includes historical data for the pedestrian 102 and/or historical data for another individual. That is, the unfamiliarity module 224 may acquire baseline pedestrian data 748, stored as sensor data 214, and baseline population data 750, which is also stored as sensor data 214. The baseline data may be identified or characterized by whether or not it is associated with the subject in an unfamiliar or familiar area. That is, the pedestrian 102 and other users may exhibit certain patterns when navigating an unfamiliar area and other patterns when navigating a familiar area. The unfamiliarity module 224 may detect similarities and deviations between the behaviors of the pedestrian 102 and the historical patterns.

Note that the unfamiliarity module 224 may consider several factors when outputting an indication. However, as each deviation from baseline data may not conclusively indicate unfamiliarity, the unfamiliarity module 224 considers and weighs different deviations when generating the indication. For example, as described above, the unfamiliarity module 224 may consider the quantity, frequency, and degree of deviation between the sensor data 214 and the baseline data 748 and 750 when generating the indication. Specifically, the unfamiliarity module 224 may include instructions that cause the processor 220 to classify the pedestrian 102 based on at least one of 1) a degree of deviation between the sensor data 214 and the baseline data and/or 2) a number of deviations between the sensor data 214 and the baseline data within a period. In other words, the unfamiliarity module 224 may be a machine-learning module that considers the quantity and quantity of deviations over time to infer the unfamiliar state 752 of the pedestrian 102.

Note that in some examples, the machine-learning model is weighted to rely more heavily on baseline pedestrian data 748 than baseline population data 750. That is, while certain global behaviors may indicate unfamiliarity with an area, some users behave in a way that deviates from the global behavior but does not constitute unfamiliarity. As such, the unfamiliarity module 224 may weigh the baseline pedestrian data 748 more heavily than the baseline population data 750.

In any case, the indication may be passed to the unfamiliarity module 224 to refine the machine-learning algorithm. For example, the pedestrian 102 may be prompted to evaluate the classification provided. This pedestrian feedback may be transmitted to the unfamiliarity module 224 such that future classifications may be generated based on the correctness of past classifications. That is, feedback from the pedestrian 102 or other sources may be used to refine the unfamiliarity module 224 to infer the pedestrian unfamiliarity state 752 more accurately based on measured sensor data 214. In summary, the unfamiliarity module 224, in some examples relying on machine learning, receives sensor data 214 and baseline data as input and outputs a likelihood of whether the pedestrian is unfamiliar in an area.

The machine-learning model may take various forms, including a machine-learning model that is supervised, unsupervised, or reinforcement-trained. In one particular example, the machine-learning model may be a neural network that includes any number of 1) input nodes that receive sensor data 214 and baseline data, 2) hidden nodes, which may be arranged in layers connected to input nodes and/or other hidden nodes and which include computational instructions for computing outputs, and 3) output nodes connected to the hidden nodes which generate an output indicative of the unfamiliar state 752 of the pedestrian 102.

In one configuration, the machine learning algorithm is embedded within the unfamiliarity module 224, such as a convolutional neural network (CNN) or an artificial neural network (ANN) to perform pedestrian unfamiliarity classification over the sensor data 214 from which further information is derived. Of course, in further aspects, the unfamiliarity module 224 may employ different machine learning algorithms or implement different approaches for performing the familiarity classification, which can include logistic regression, a naïve Bayes algorithm, a decision tree, a linear regression algorithm, a k-nearest neighbor algorithm, a random forest algorithm, a boosting algorithm, and a hierarchical clustering algorithm among others to generate unfamiliarity classifications. Other examples of machine learning algorithms include but are not limited to deep neural networks (DNN), including transformer networks, convolutional neural networks, recurrent neural networks (RNN), Support Vector Machines (SVM), clustering algorithms, Hidden Markov Models, and so on. It should be appreciated that the separate forms of machine learning algorithms may have distinct applications, such as agent modeling, machine perception, and so on.

Moreover, it should be appreciated that machine learning algorithms are generally trained to perform a defined task. Thus, the training of the machine learning algorithm is understood to be distinct from the general use of the machine learning algorithm unless otherwise stated. That is, the navigation assistance system 100 or another system generally trains the machine learning algorithm according to a particular training approach, including supervised training, self-supervised training, reinforcement learning, etc. In contrast to training/learning of the machine learning algorithm, the navigation assistance system 100 implements the machine learning algorithm to perform inference. Thus, the general use of the machine learning algorithm is described as inference.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. The systems, components and/or processes also can be embedded in a computer-readable storage, such as a computer program product or other data program storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. A non-exhaustive list of the computer-readable storage medium can include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or a combination of the foregoing. In the context of this document, a computer-readable storage medium is, for example, a tangible medium that stores a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:

a processor; and a memory storing machine-readable instructions that, when executed by the processor, cause the processor to:

determine that a pedestrian is unfamiliar with an area based on sensor data that captures physiological characteristics of the pedestrian that characterize the pedestrian as unfamiliar with the area; and responsive to an indication that the pedestrian is unfamiliar with the area:

acquire a navigational route presented on a user device of the pedestrian;

identify a target entity, ahead of the pedestrian at a waypoint along the navigational route, that has an electronic display device;

initiate a handshake operation, with the target entity ahead of the pedestrian, to present navigational assistance on the electronic display device; and present the navigational assistance on the electronic display device, the navigational assistance is based on the navigational route.

2. The system of claim 1, wherein the machine-readable instruction that, when executed by the processor, causes the processor to present the navigational assistance on the electronic display device comprises a machine-readable instruction that, when executed by the processor, causes the processor to present the navigational assistance on an electronic display device of an infrastructure element.

3. The system of claim 1, wherein the machine-readable instruction that, when executed by the processor, causes the processor to present the navigational assistance on the electronic display device comprises a machine-readable instruction that, when executed by the processor, causes the processor to present the navigational assistance on an exterior electronic display device of a vehicle.

4. The system of claim 1, wherein:

the machine-readable instructions further comprise a machine-readable instruction that, when executed by the processor, causes the processor to detect a gaze direction of the pedestrian; and the machine-readable instruction that, when executed by the processor, causes the processor to present the navigational assistance on the electronic display device comprises a machine-readable instruction that, when executed by the processor, causes the processor to present the navigational assistance on an electronic display device in the gaze direction of the pedestrian.

5. The system of claim 1, wherein the machine-readable instructions further comprise a machine-readable instruction that, when executed by the processor, causes the processor to indicate, on the user device, a format of the navigational assistance.

6. The system of claim 1, wherein:

the machine-readable instructions further comprise a machine-readable instruction that, when executed by the processor, causes the processor to collect profile information for the pedestrian that indicates an establishment that the pedestrian has visited; and the machine-readable instruction that, when executed by the processor, causes the processor to present the navigational assistance on the electronic display device comprises a machine-readable instruction that, when executed by the processor, causes the processor to present a location of the establishment on a map of the user device.

7. The system of claim 1, wherein:

the machine-readable instructions further comprise a machine-readable instruction that, when executed by the processor, causes the processor to collect profile information for the pedestrian and profile information for other individuals, the profile information indicates profile characteristics for the pedestrian and the other individuals; and the machine-readable instruction that, when executed by the processor, causes the processor to present navigational assistance on the electronic display device comprises a machine-readable instruction that, when executed by the processor, causes the processor to identify, on the user device, another individual in the area that shares a profile characteristic with the pedestrian.

8. The system of claim 1, wherein the machine-readable instructions further comprise machine-readable instructions that, when executed by the processor, cause the processor to:

determine travel regulations that pertain to the area; and present the travel regulations on the user device.

9. The system of claim 1, wherein:

the machine-readable instruction that, when executed by the processor, causes the processor to determine that the pedestrian is unfamiliar with the area comprises a machine-learning instruction that, when executed by the processor, causes the processor to identify deviations between baseline data and the sensor data; and the baseline data comprises at least one of:

historical data for the pedestrian; or historical data for another individual.

10. The system of claim 1, wherein the machine-readable instruction that, when executed by the processor, causes the processor to determine that the pedestrian is unfamiliar with the area comprises a machine-readable instruction that, when executed by the processor, causes the processor to assess at least one of:

biometric data for the pedestrian;

images of the pedestrian; or location-based sensor data of the user device.

11. A non-transitory machine-readable medium comprising instructions that, when executed by a processor, cause the processor to:

determine that a pedestrian is unfamiliar with an area based on sensor data that captures physiological characteristics of the pedestrian that characterize the pedestrian as unfamiliar with the area; and responsive to an indication that the pedestrian is unfamiliar with the area:

acquire a navigational route presented on a user device of the pedestrian;

identify a target entity, ahead of the pedestrian at a waypoint along the navigational route, that has an electronic display device;

initiate a handshake operation, with the target entity ahead of the pedestrian, to present navigational assistance on the electronic display device; and present the navigational assistance on the electronic display device, the navigational assistance is based on the navigational route.

12. The non-transitory machine-readable medium of claim 11, wherein the instruction that, when executed by the processor, causes the processor to present the navigational assistance on the electronic display device comprises an instruction that, when executed by the processor, causes the processor to present the navigational assistance on an electronic display device of at least one of an infrastructure element or a vehicle.

13. The non-transitory machine-readable medium of claim 11, wherein:

the instructions further comprise an instruction that, when executed by the processor, causes the processor to collect profile information for the pedestrian that indicates an establishment that the pedestrian has visited; and the instruction that, when executed by the processor, causes the processor to present the navigational assistance on the electronic display device comprises an instruction that, when executed by the processor, causes the processor to present a location of the establishment on a map of the user device.

14. The non-transitory machine-readable medium of claim 11, wherein the non-transitory machine-readable medium further comprises instructions that, when executed by the processor, cause the processor to:

determine travel regulations that pertain to the area; and present the travel regulations on the user device.

15. The non-transitory machine-readable medium of claim 11, wherein:

the instruction that, when executed by the processor, causes the processor to determine that the pedestrian is unfamiliar with the area comprises an instruction that, when executed by the processor, causes the processor to identify deviations between baseline data and the sensor data; and the baseline data comprises at least one of:
historical data for the pedestrian; or
historical data for another individual.

16. A method, comprising:

determining that a pedestrian is unfamiliar with an area based on sensor data that captures physiological characteristics of the pedestrian that characterize the pedestrian as unfamiliar with the area; and responsive to an indication that the pedestrian is unfamiliar with the area:

acquiring a navigational route presented on a user device of the pedestrian;

identifying a target entity, ahead of the pedestrian at a waypoint along the navigational route, that has an electronic display device;

initiating a handshake operation, with the target entity ahead of the pedestrian, to present navigational assistance on the electronic display device; and presenting the navigational assistance on the electronic display device, the navigational assistance is based on the navigational route.

17. The method of claim 16, wherein presenting the navigational assistance on the electronic display device comprises presenting the navigational assistance on an electronic display device of at least one of an infrastructure element or a vehicle.

18. The method of claim 16, wherein:

the method further comprises collecting profile information for the pedestrian and profile information for other individuals, the profile information indicates profile characteristics for the pedestrian and the other individuals; and presenting the navigational assistance on the electronic display device comprises identifying, on the user device, another individual in the area that shares a profile characteristic with the pedestrian.

19. The method of claim 16, wherein:

the method further comprises determining travel regulations that pertain to the area; and presenting navigational assistance on the electronic display device comprises presenting the travel regulations on the user device.

20. The method of claim 16, wherein determining that the pedestrian is unfamiliar with the area comprises assessing biometric data that characterizes the pedestrian.

* * * * *